(12) United States Patent
Kalamkar et al.

(10) Patent No.: US 11,062,022 B1
(45) Date of Patent: Jul. 13, 2021

(54) CONTAINER PACKAGING DEVICE

(71) Applicant: Intuit Inc., Mountain View, CA (US)

(72) Inventors: Amit Kalamkar, Mountain View, CA (US); Aram Martirosyan, Woodland Hills, CA (US); Sriramu Singaram, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 190 days.

(21) Appl. No.: 16/400,170

(22) Filed: May 1, 2019

(51) Int. Cl.
  *G06F 21/57* (2013.01)
  *G06F 21/53* (2013.01)
  *G06F 8/71* (2018.01)

(52) U.S. Cl.
  CPC ............... *G06F 21/53* (2013.01); *G06F 8/71* (2013.01); *G06F 21/577* (2013.01)

(58) Field of Classification Search
  CPC ........ G06F 21/53; G06F 21/57; G06F 21/577; G06F 8/63; G06F 8/71
  See application file for complete search history.

(56) References Cited

U.S. PATENT DOCUMENTS

| 8,924,930 | B2* | 12/2014 | Fries | G06F 9/45558 |
| | | | | 717/120 |
| 9,355,248 | B1* | 5/2016 | Wiest | G06F 9/45558 |
| 2012/0072968 | A1* | 3/2012 | Wysopal | G06F 11/3612 |
| | | | | 726/1 |
| 2017/0068676 | A1* | 3/2017 | Jayachandran | G06F 16/125 |
| 2017/0098072 | A1* | 4/2017 | Stopel | G06F 21/564 |
| 2017/0109536 | A1* | 4/2017 | Stopel | G06F 21/577 |
| 2018/0054469 | A1* | 2/2018 | Simoncelli | H04L 12/4641 |
| 2018/0114025 | A1* | 4/2018 | Cui | G06F 8/65 |
| 2018/0300220 | A1* | 10/2018 | Agarwal | G06F 11/3688 |
| 2019/0005246 | A1* | 1/2019 | Cherny | G06F 21/57 |

(Continued)

FOREIGN PATENT DOCUMENTS

WO  WO-2020161577 A1 * 8/2020 ........... G06F 21/602

OTHER PUBLICATIONS

Zerouali et al. "On the Relation between Outdated Docker Containers, Severity Vulnerabilities, and Bugs" [Online], Mar. 18, 2019 [Retrieved on: Jan. 1, 2021], 2019 IEEE 26th SANER (Feb. 24-27, 2019), www.ieee.org, Retrieved from: < https://ieeexplore.ieee.org/stamp/stamp.jsp?tp=&arnumber=8668013 > (Year: 2019).*

*Primary Examiner* — Eric W Shepperd
(74) *Attorney, Agent, or Firm* — Ferguson Braswell Fraser Kubasta PC

(57) ABSTRACT

A method for generating a software container includes receiving a software application and a containerization file. The method also includes building an image file using the containerization file, the image file containing the software application. The method also includes recording, in the image file, an image lineage. The method also includes performing a security scan of the image file to obtain a result, the security scan comprising checking the image file for inadequacies. The method also includes assigning, to the image file, a security level selected from among a plurality of different predetermined security levels. Assigning is based on a combination of the image lineage and the result of the security scan. The method also includes signing the image file with the security level to create a signed image file. The method also includes storing the signed image file as the software container.

19 Claims, 7 Drawing Sheets

(56) References Cited

U.S. PATENT DOCUMENTS

| | | | |
|---|---|---|---|
| 2019/0294780 A1* | 9/2019 | Melamed | G06F 21/53 |
| 2020/0082095 A1* | 3/2020 | Mcallister | G06F 11/323 |
| 2020/0097662 A1* | 3/2020 | Hufsmith | H04L 67/10 |
| 2020/0159933 A1* | 5/2020 | Ciano | G06F 21/577 |
| 2020/0202006 A1* | 6/2020 | Shah | G06F 8/77 |
| 2020/0204374 A1* | 6/2020 | Skertic | H04L 9/3242 |
| 2020/0301791 A1* | 9/2020 | Zhang | G06F 9/455 |
| 2020/0410089 A1* | 12/2020 | Zhang | G06F 21/54 |

* cited by examiner

US 11,062,022 B1

CONTAINER PACKAGING DEVICE

BACKGROUND

In software execution and design, a common technical issue is that different software sometimes requires different computing environments to function correctly. For example, a given software program may execute correctly on one operating system (e.g., WINDOWS® operating system), but perform incorrectly or fail to execute on a different operating system (e.g., macOS® operating system). In another example, the supporting software which supports the main application may have changed between test time and runtime, such as when a software application is tested using Python 2.7 but then executed using Python 3.0. In still another example, a software application may function as expected on one network topology, but not another.

SUMMARY

In general, in one aspect, one or more embodiments relate to a method for generating a software container. The method includes receiving a software application and a containerization file. The method also includes building an image file using the containerization file, the image file containing the software application. The method also includes recording, in the image file, an image lineage. The method also includes performing a security scan of the image file to obtain a result, the security scan comprising checking the image file for inadequacies. The method also includes assigning, to the image file, a security level selected from among a plurality of different predetermined security levels. Assigning is based on a combination of the image lineage and the result of the security scan. The method also includes signing the image file with the security level to create a signed image file. The method also includes storing the signed image file as the software container.

The one or more embodiments also relate to a non-transitory computer readable medium including computer readable program code. The computer readable program code is for causing a computer system to receive a software application and a containerization file. The computer readable program code is also for causing a computer system to build an image file using the containerization file, the image file containing the software application. The computer readable program code is also for causing a computer system to record, in the image file, an image lineage. The computer readable program code is also for causing a computer system to perform a security scan of the image file to obtain a result, the security scan comprising checking the image file for inadequacies. The computer readable program code is also for causing a computer system to assign, to the image file, a security level selected from among a plurality of different predetermined security levels. Assigning is based on a combination of the image lineage and the result of the security scan. The computer readable program code is also for causing a computer system to sign the image file with the security level to create a signed image file. The computer readable program code is also for causing a computer system to store the signed image file as the software container.

The one or more embodiments also relate to a system. The system includes a data repository storing a software application and a containerization file. The system also includes an image file builder configured to: build, using the containerization file, an image file containing the software application, record an image lineage for the image file, and add the image lineage to the image file. The system also includes a decision engine configured to: receive a security scan result produced as a result of performing a security scan on the image file with the image lineage, determine a security level of the image file based a combination of the image lineage and the security scan result, the security level selected from a plurality of pre-determined security levels, and sign the image file with the security level to form a signed image file. The system also includes a publisher configured to publish the signed image file to an artifact repository manager based on the security level identified in the signed image file.

Other aspects of the invention will be apparent from the following description and the appended claims.

DETAILED DESCRIPTION

Figure 1:
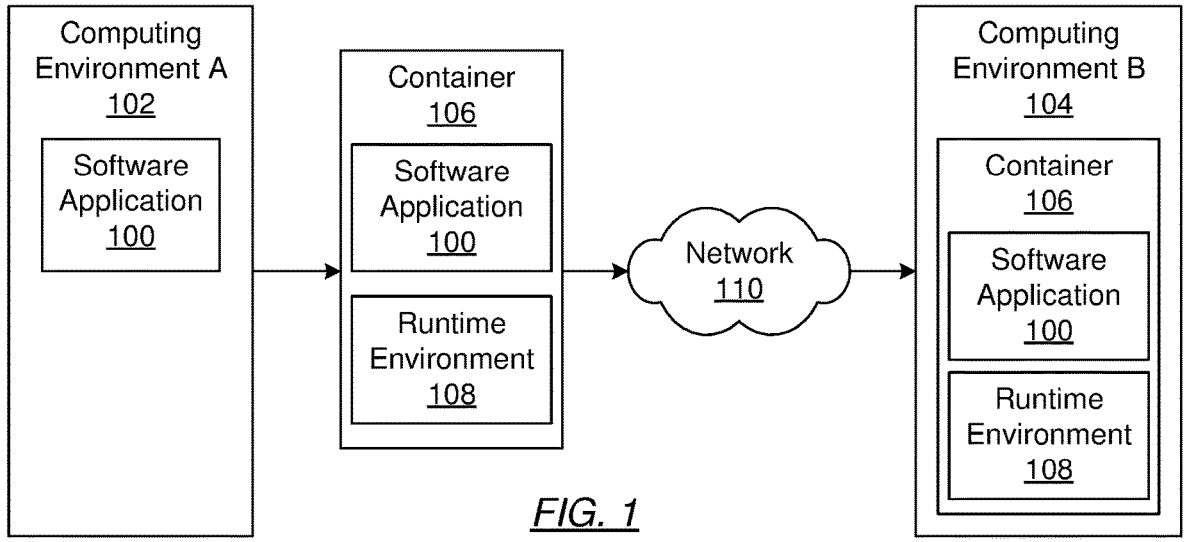
FIG. 1, FIG. 2, and FIG. 3 depict schematic system diagrams, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to new and improved techniques for generating containers for software programs. In the software arts, a "container" is a package of one or more executable software programs with supporting data. Software containers are described more fully with respect to FIG. 1. The one or more embodiments provide for a container packaging daemon that automatically creates secure containers. A secure container is a container that has been checked for errors and vulnerabilities, and which is signed with a security level. The security level can be used to control the production, distribution, and execution of a container. One or more embodiments add security and hygiene layers to the containerization process at a scale of large enterprise systems. In this manner, the one or more embodiments provide for an improved technique for automatically generating containers at the scale desirable for large enterprise systems, with the hygiene and security desired by the enterprise systems.

FIG. 1 depicts a schematic diagram illustrating containerization of a software application. In the example of FIG. 1, software application (100) is designed and tested for use in computing environment A (102). However, a programmer has decided that the software application (100) should also be executable in computing environment B (104), which may be incompatible with computing environment A (102). In other words, software application (100) will execute properly in computing environment A (102), but may not execute properly in desirable computing environment B (104).

A computing environment is supporting software, data, and hardware, also known as "infrastructure", which permits the execution of the software application (100). A computing environment may include one or more of an operating system (e.g., various versions of WINDOWS® operating system, various versions of macOS® operating system, etc.), the computer language that makes the software program (100) executable on a computer (e.g., C++, Python, etc.), a network topology, specific types of computer chips or other hardware, software libraries (e.g., dynamic link libraries (DLL files), memory management support software, and possibly many other hardware and software parts of a computer that allow the software application (100) to execute properly.

In order to address this technical challenge, the programmer creates a container (106) which contains the software application (100) plus a runtime environment (108) that supports the software application (100) in a variety of different, sometimes incompatible, computing environments. The runtime environment may include the dependencies, libraries and other binaries, and configuration files used to properly execute the software application (100) in either or both of computing environment A (102) or computing environment B (104).

The runtime environment (108) may, in some cases, be characterized as specialized components of a computing environment. Thus, for example, the runtime environment (108) included in the container (106) may include the software libraries used by computing environment B (104) to execute the software application (100) that had been designed and tested in computing environment A (102).

The process of creating the container (106) is called "containerization" or "containerizing". By containerizing the software application (100) and its runtime environment (108), differences in operating system distributions, network topologies, supporting software, and other underlying technical infrastructure no longer affect the execution of the software application (100). In effect, containerization attempts to make the software of interest "infrastructure independent"; i.e., when containerized, the software of interest can be executed properly on many different operating systems, network topologies, and supporting infrastructures, including in particular computing environment B (104).

Stated differently, containerization makes the software application (100) "portable" among different computing environments. "Portable" software is, in some circumstances, considered desirable. Thus, for example, the container (106) may be transmitted via network (110) to computing environment B (104) so that the software application (100) may be executed on computing environment B (104).

The container (106) in FIG. 1 is created "manually". In other words, the programmer uses a user interface to command a computer to place the software application (100) and, individually, the elements of the runtime environment (108) into the container (106).

However, manual creation of the container (106) may be undesirable. For example, the container (106) may contain inadequacies, such as but not limited to errors, missing elements, security vulnerabilities, and others, that arise on account of human error. Additionally, the manually created container (106) may be suitable for testing, but not runtime execution. Moreover, manual creation of the container (106) is not scalable for large enterprises for which many hundreds, thousands, or even millions of containers are to be created and distributed rapidly, correctly, and effectively. The one or more embodiments address these and other technical challenges.

Figure 2:
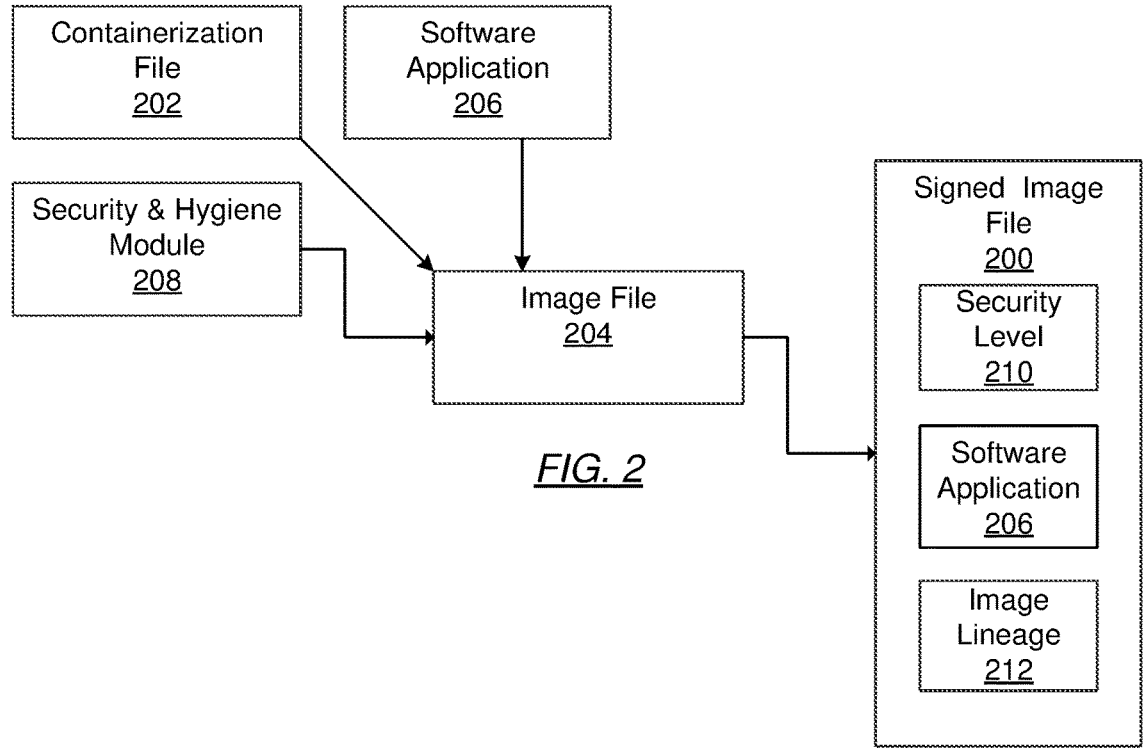

FIG. 2 is a schematic diagram of an overview of the one or more embodiments for automatic building of secure, hygienic containers. As used herein, a "secure" container is a container that poses at least a user-determined acceptable risk of undesirable changes either to aspects of the container itself when deployed, or to an enterprise or computing environment in which the container will be deployed. A "hygienic" container is a container that behaves as expected once deployed in a computing environment.

In FIG. 2, the final container created according to the one or more embodiments is the signed image file (200). One technique for automatically building the signed image file (200) is to start with a containerization file (202). The containerization file (202) is a pre-determined arrangement of runtime environment routines and other data that is typically used in a container, which is typically stored in a data repository. The containerization file (202) forms the basis for the image file (204) that is proposed to be deployed in the enterprise or other runtime environment.

The software application (206), as identified by a user or an automated process, is the software of interest that will be added to the image file (204). In other words, the software application is the target application to be deployed to various computing devices using the containers. Additionally, a security and hygiene module (208) is configured to automatically analyze the image file (204) to identify security risks, vulnerabilities, errors, and the like. Examples of the operations of the security and hygiene module (208) are given with respect to FIG. 4.

Once the image file (204) is complete, the security and hygiene module (208) is configured to sign the image file (204) with a security level (210) and to add an image lineage (212) to the signed image file (200). Thus, the signed image file (200) is the image file (204) that is signed. The signed image file (200) includes the software application (206), the security level (210), and the image lineage (212).

The security level (210) defines the level of compliance of the signed image file (200) with a set of deployment requirements. In particular, the deployment requirements, or the set of rules defining when an image file can be deployed, are partitioned into security levels. An alternative term for "security level" (210) is a "label", as the "security level" (210) alone does not provide any security to the image file (204). Nevertheless, another process can read the security level (210), or "label", and then process the signed image file (200) accordingly. Additional details regarding the security level (210) is presented with respect to FIG. 3. The image lineage (212) is a history of how and/or when the signed image file (200) was created. Additional details regarding the image lineage (212) is presented with respect to FIG. 3.

Figure 3:
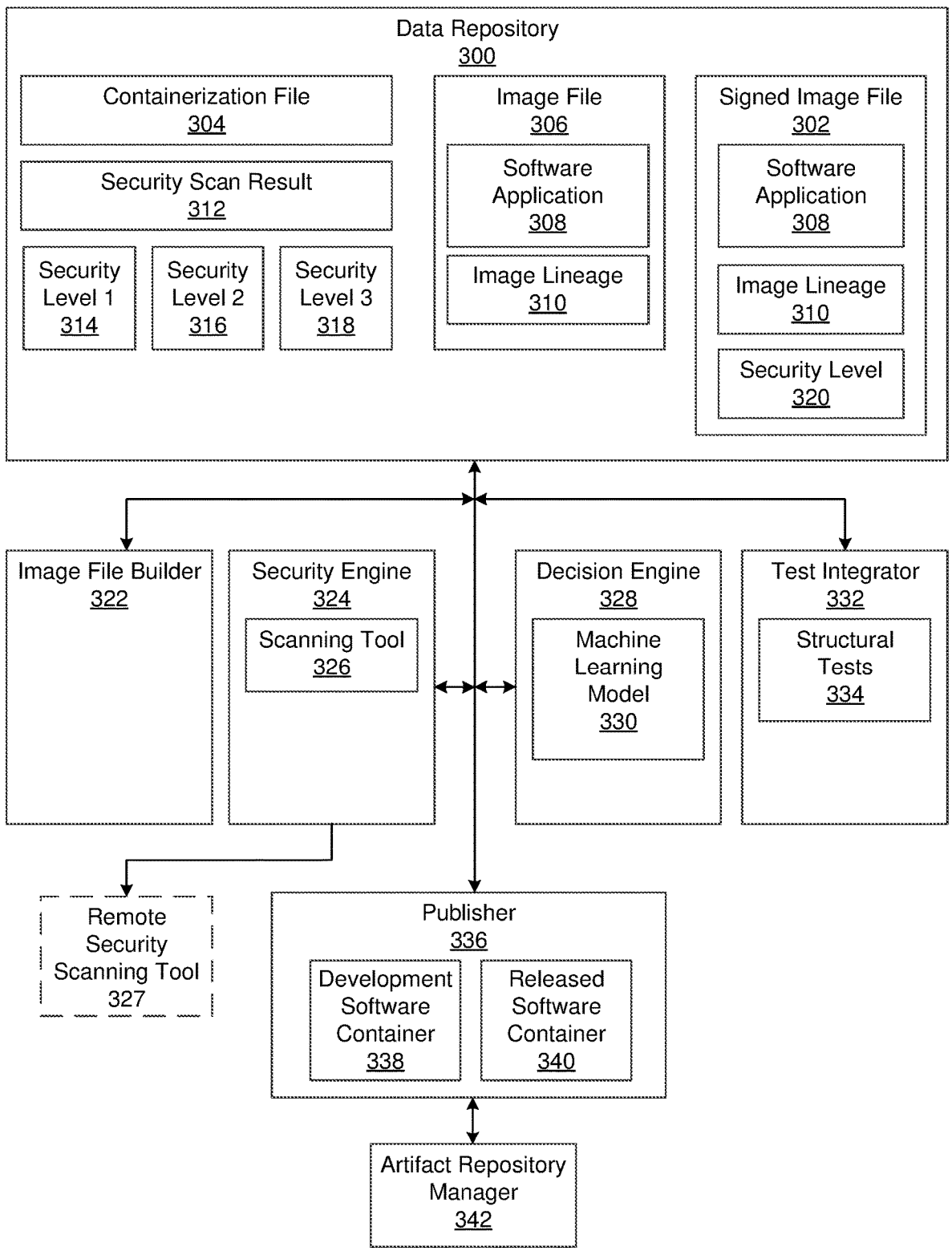

FIG. 3 is a schematic diagram illustrating a system for automatically creating containers stored in a data repository (300), such as signed image file (302). The system shown in FIG. 3 is a variation of the system shown in FIG. 2. The system shown in FIG. 3 is an architecture for a container packaging device (CPD) of the one or more embodiments. The container packaging device software may be written in Golang, and may be self-driven software within an enterprise system.

In general, a data repository (300) is a storage unit (e.g., database, file system, or other storage structure) and/or hardware or virtual device (e.g., memory, storage server, etc.) for storing data. The data repository (300) may include multiple homogeneous or heterogeneous storage units or devices. Data repository (300) stores a number of files and other information, in addition to signed image file (302). For example, data repository (300) stores containerization file (304). Like the containerization file (204) of FIG. 2, the containerization file (304) is the basis for automatically creating both the image file (306) and the signed image file (302). The containerization file may be a container file template, as described with respect to FIG. 2, or may be a file constructed by a utility which gathers the desired components used to execute the software application (308) in a variety of different computing environments.

In an embodiment, the containerization file (304) may be a DOCKER® file created using a DOCKER® utility. In an embodiment, the containerization file (304) may include standardized security configurations, such as but not limited to NGINX®/APACHE® TLS utility, secure sockets layer (SSL) ciphers, TOMCAT®/JAVA® cryptography extension (JCE) policy files, and others. Each containerization file may also include application performance management (APM) plug-ins to publish metrics into an International Business Machines Cloud Kubernetes Services (IKS®) service mesh which may eventually migrate to a DOCKER® sidecar container. The containerization file (304) may also be stripped of extraneous components, such as cups, dnsmasq, and application stacks like TOMCAT® test jars, and others.

The containerization file (304) may have an image lineage (310) and the software application (308) added to it, resulting in the image file (306). The image lineage is an ordered list of runtime environment programs and data items that are in the containerization file or are used to create the containerization file. For example, the image lineage may describe a specific DOCKER® file used as the base containerization file (304), an identity and source of the software application (308), and the identity and source of any other runtime environment programs and data items that have been added to the image file (306).

The image lineage (310) may include the following information for each layer: DOCKER® file GITHUB® link, DOCKER® file from information, the "from image digest" the GITHUB® branch, the GITHUB® commit author, GITHUB® commit time, GITHUB® link, git commit hash, JIRA® issue, JIRA® project name, maintainer, any unauthorized source images from a single or multi-stage build, and any other pertinent information. The image lineage (310) may also include programmer comments or other notes that may be of value when a programmer evaluates or reviews the image lineage (310) or the signed image file (302). The image lineage may also include metadata, such as but not limited to a source from which an element was received, a release version, a link to a source element, time of build, a list of elements, time of publication, time of version release and JIRA® project values. An "element" is a specific type of data or other object stored within the image file (306). Thus, an "element" may be but not limited to, a specific containerization file used, a software program disposed within the container, a runtime library, and/or other types of data stored in the image file (306).

The data repository may also store a security scan result (312). The security scan result is data and metadata describing the results of a security engine scan of the image file (306). The security scan result (312) may be one of many security levels. In an example, three security levels may be available, such as security level 1 (314), security level 2 (316), and security level 3 (318), though the one or more embodiments contemplate or more or fewer security levels. A lower valued security level represents a lower degree of confidence that the image file (306) is ready for release in an enterprise or other computing environment. For ease of reference, security level 1 (314) could be referred to as "bronze", security level 2 (316) could be referred to as "silver", and security level 3 (318) could be referred-to as "gold."

Security level 1 (316), "bronze", is ready for publication only in a development space for further development by a programmer. A bronze security level may be defined by the following standards, though these standards could be changed. The image file (306) may include a non-root user and starting containers based on the image defaults to that non-root user. The image file (306) may not contain a server service. The image file (306) might not include passwords, keys, or other secrets. The image file (306) is free of vulnerabilities. The software application (308) is still under development.

Security level 2 (316), "silver", is readier for release than security level 1 (314), but is still not yet ready for release in the enterprise or the destination computing environment. A silver security level may include the features of the bronze security level, and also may have the following additional characteristics. The image file (306) may be successfully scanned by a security scanning module and/or a container structure test. The image file (306) may not include a shell. The image might not include certain software applications that provide higher attack vectors, such as but not limited to curl, sudo, wget, yum, apt-get, apk, telnet, etc. The image file might not include the ssh server service. The image file might not include any host volume mount paths. The image file might have been built using a continuous integration, continuous deliver (CI/CD) system.

Security level 3 (318), "gold", is ready for release in the enterprise or the destination computing environment. A gold security level may include the features of the silver security level, and also may have the following additional characteristics. The image file (306) may have some administrative level commands available to a user for development. A hardening script may be required to remove the image file (306) from the enterprise or computing environment. Automated promotion does not apply to the image file (306). The image file (306) has no identified vulnerabilities, or a vulnerability exception document has been created, agreed-to by a computing environment supervisor, and associated with the image file (306). The image file (306) must have been built using a CI/CD system.

As described with respect to FIG. 2, the image file is signed with the security level. Thus, the signed image file (302) includes the software application (308), the image lineage (310), and the security level (320) assigned by the security scan result (312) (i.e., any one of security level 1 (314), security level 2 (316), and security level 3 (318)). The signed image file (302) is the image ready for publication to an enterprise or computing environment, as limited by the security level (320).

In an embodiment, the signed image file (302) may be referred-to as a standard container image. A standard container image is an image of an executable container with secure software configurations packaged and put through the rigors of testing, signing (trust), and vulnerability scanning. A standard container is eventually published into an enterprise or other computing environment, such as a JFROG ARTIFACTORY® environment or any other registry. The standard container images may be stripped off unnecessary components based on security inputs to reduce blast radius (i.e., the aggregate affect the signed image file (302) will have on the destination computing environment). The standard container image thus built may function as a parent for descendent application service containers. A standard container images may be built using any number of different tools or languages, including but not limited to the JAVA® language, an NGINX® server, and TOMCAT® tools.

The data repository (data repository (300)) may be in communication with a number of different engines and tools used in the process of creating the signed image file (302). Operation of these different engines and tools is described further with respect to FIG. 4.

For example, an image file builder (322) may be software or hardware used to create the image file (306). A security engine (324) may be software or hardware used to perform the security scan result (312) using a scanning tool (326). In one embodiment, the scanning tool (326) is a tool operated on a local system. However, in another embodiment, the scanning tool (326) may be remote from the system, and thus FIG. 3 shows a remote security scanning tool (327). The remote security scanning tool (327) may be substituted for the scanning tool (326), or may operate in addition to the scanning tool (326).

The scanning tool (326) or the remote security scanning tool (327) may be, in a specific example, a TWISTLOCK® service, operating system specific security tests, or other tools useful for scanning containers or debugging software. Other examples include a contrast assess agent for interactive application security testing (IAST), Qualys for dynamic application security testing (DAST), and a threat modeler for performing an architectural risk analysis (ARA).

The system shown in FIG. 3 may also include decision engine (328). The decision engine (328) may be, or include, a machine learning model (330) used to determine the security level (320) based on information in the security scan result (312). The machine learning model (330) may be a Shannon entropy decision tree model, but may be some other model. The input to the machine learning model may be received from the scanning tool (326) or other aspects of the security engine (324). In a specific example, the machine learning model (326) may analyze input from TWISTLOCK® tool, a container structure test, a hardening test, and a DOCKER® file lint test. The output of the machine learning model (330) is a prediction regarding how vulnerable the image file (306) is, which can then be used by the decision engine (328) to assign the security level to the image file (306). The Shannon decision tree learning algorithm may take as input an input vector's weighted values and then label the container (bronze/silver/gold) based on its output risk profile. The input vector may be weighted according to the information theory definition of entropy of the input data. The information theory definition of entropy for a multiclass input is $$E = -\sum_{i=1}^{n} p_i \log_2 p_i,$$

where n the number of classes of information, $p_i$ is the probability of an object from the $i^{th}$ class appearing, $\Sigma$ is a summation mathematical operator, and $\log_2$ is a logarithmic mathematical operator.

The system shown in FIG. 3 may also include a test integrator (332). The test integrator (332) may apply structural tests (334) to the image file (306). The results of the test integrator (332) may be provided to the security engine (324) or to the decision engine (328) as part of determining the security scan result (312). The structural tests (334) are one or more pre-defined tests used to test the image file (306). The structural tests (334) may include command tests, image entry point tests, file existence tests, file content tests, metadata tests, license tests, and environmental variable tests. In a specific embodiment, the structural tests (334) may be GOOGLE® open source structural tests. The testing framework may be applied to pick up declarative test YML files for running additional tests against the image file (306) (the term "YML" refers to a type of file extension for files in the YAML format, which is a human-readable data serialization language that takes concepts from a number of programming languages such as C, Perl, and Python and ideas from the extensible markup language (XML) and the data format of electronic mail.)

The system shown in FIG. 3 also includes a publisher (336). The publisher may be software or hardware programmed to publish the signed image file (302) to an enterprise or some other computing environment. For example the publisher (336) could publish the signed image file (302) to an artifact repository manager (342) or some other data repository. An example of an artifact repository manager (342) is JFROG ARTIFACTORY® environment. However, the publisher 336 could also publish the signed image file (302) to a data repository (including but not limited to data repository (300)), or to some other computing environment.

The publisher (336) may publish the signed image file (302) as a development software container (338) or as a released software container (340). In either case, the container is the signed image file (302). The difference between the two containers is that the development software container (338) has a security level (320) which is less than that of the released software container (340), thereby indicating that the development software container (338) is still only published for purposes of development and testing. Accordingly, the development software container (338) may be restricted in terms of the manner in which it can operate in the enterprise or the computing environment in which the development software container (338) is published. In an example, the security level (320) of the development software container (338) may be less than security level 3 (318) (i.e., "bronze" or "silver").

In contrast, the released software container (340) is also the signed image file (302), but has a security level (320) which is high enough for general use by the artifact repository manager (342) or other enterprise or computing environment. For example, the security level (320) of the released software container may be security level 3 (318) (i.e., "gold"). Thus, the released software container (340) may be used generally, as intended, within the enterprise or other computing environment in which the released software container (340) has been published.

Figure 4:
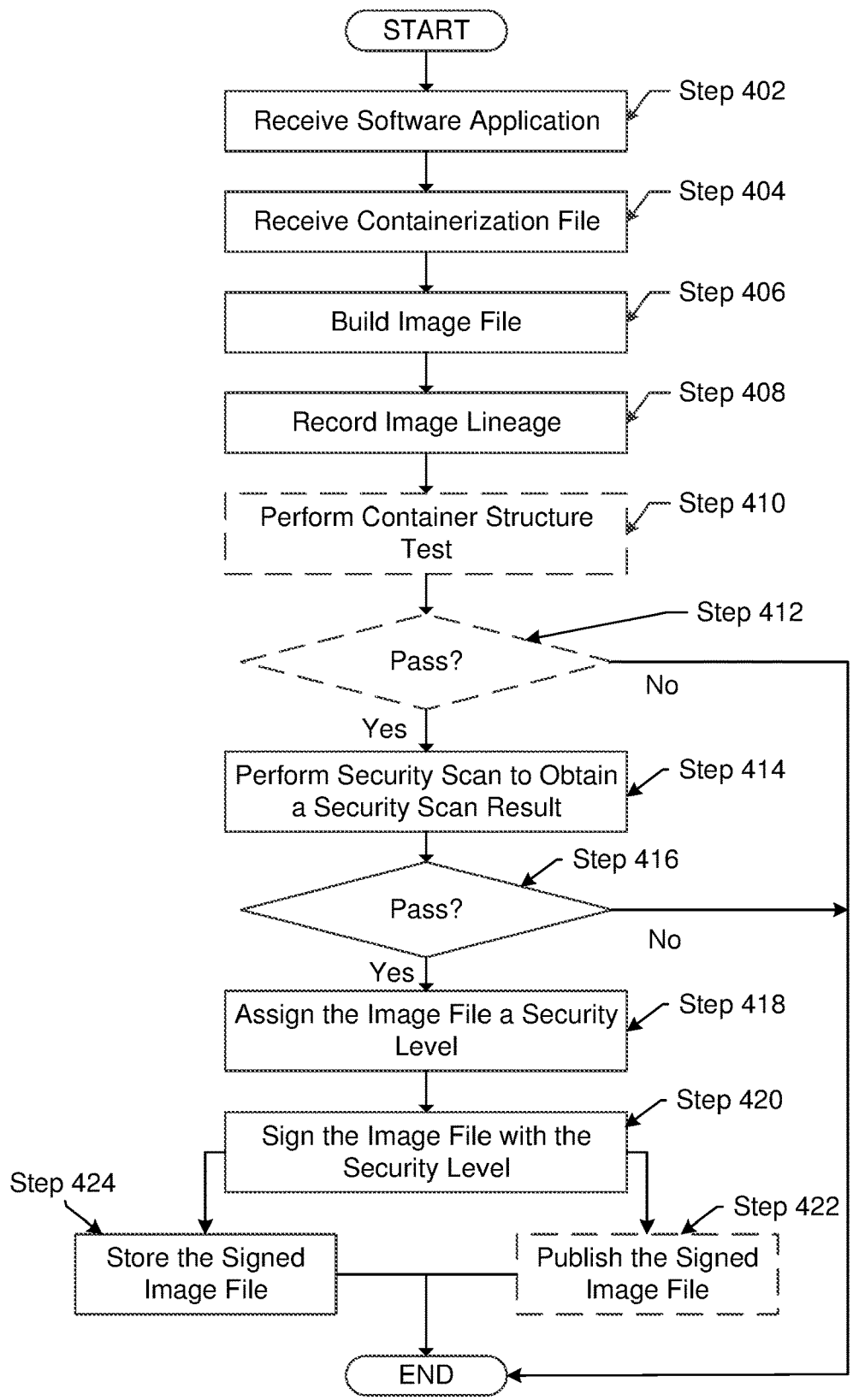
FIG. 4 depicts a flowchart diagram, in accordance with one or more embodiments.

FIG. 4 depicts a flowchart diagram, in accordance with one or more embodiments. In particular, FIG. 4 is a method of automatically generating a software container. FIG. 4 is also an example of an algorithm representing operational details of a container packaging device, such as represented by the systems shown in FIG. 2 or FIG. 3. Thus, the flow shown in FIG. 4 may be executed using a "container packaging device" (CPD) program, which could be a daemon. Again, an example of a "CPD" is shown in FIG. 3.

In step 402, the CPD receives a software application. The software application may be received by either an automated process passively receiving the software application for processing, by an automated process actively retrieving the software application from a data repository, or by a user interacting with a graphical user interface (GUI) to specify the software application to be containerized. In an embodiment, a script, such as a JENKINS® file, may automatically check out the source code that is the basis of the software application to be placed in a container.

Optionally, the CPD may package the software application automatically with application management (APM) plug-ins to publish metrics regarding the software application into a service mesh. In a specific example, APM plugins may publish metrics into an IKS® service mesh, which will then migrate to a DOCKER® native approach as a sidecar container, such as a PROMETHEUS® client.

In step 404 the CPD receives a containerization file. Again, the containerization file may be a container template. The containerization file may be received by either an automated process passively receiving the containerization file for processing via an application programming interface (API), by an automated process actively retrieving the containerization file from a data repository, or by a user interacting with a graphical user interface (GUI) to specify the template to be used for the containerization file. The containerization file may also be received by a user interacting with a GUI to specify pre-selected programs, libraries, other data or metadata to be used as part of the containerization file.

In an embodiment, the containerization file may be received as RED HAT® Enterprise LINUX® (RHEL) file image pulled from an artifact repository, such as JFROG ARTIFACTORY® environment. Optionally, the RHEL file image may be stripped of unnecessary components based on security inputs to reduce "blast radius" (i.e., the effect of the container image on the rest of the enterprise or other computing environment). Examples of extraneous components may include "cups", "dnsmasq", an application stack such as a TOMCAT® test jar, and other elements. In this manner, the image files built according to the method of FIG. 4 may serve as parents for descendant application service containers.

In step 406, the CPD builds an image file. The image file is built using the containerization file and the software application. Again, the image file is the containerization file, the software application, and any other instructions packaged that specify the relationship between the software application and various elements of the containerization file.

In step 408, the CPD records an image lineage. The image lineage is stored as part of the image file. An image lineage and examples of image lineages are described above with respect to FIG. 3. The history of the image is dynamically constructed at build time as an ordered list of elements. In an embodiment, each element may correspond to one DOCKER® file unless building sibling containers with the same repo. In an embodiment, at least some of the image lineage may be automatically derived. For example, a DOCKER® file link, a GITHUB® link, a GITHUB® committer, a GITHUB® commit time, a GITHUB® branch, a GIT® hash, and a JIRA® project value may all be derived dynamically by the container packaging device.

In step 410, the CPD performs a container structure test on the image file. The container structure test may be optional in some embodiments, and thus is shown as a dashed box in FIG. 4. A container structure test and examples of container structure tests are described above with respect to FIG. 3.

The container structure test may locate the test YAML file adjacent to each DOCKER® file with the name "container_structure_test_.yml" and turn the test YAM file against the container on successful container build. The container packaging device also supports multiple test files under a test directory. The container packaging device also includes code which allows a developer to exclude tests, if desirable.

At step 412, the CPD makes a determination whether the image file passed the container structure test. Again, step 412 is optional and shown in dashed lines in FIG. 4 because the container structure test is optional in some embodiments. If the container structure test fails to pass (a "no" at step 412), then the entire method terminates. Otherwise, (a "yes" at step 412), the method continues to step 414. Optionally, in addition to these operations, a DOCKER® file analysis (linter) and image efficiency test may also be performed.

At step 414, the CPD performs a security scan to obtain a security scan result. The security scan checks the image file for inadequacies. Examples of inadequacies are errors and vulnerabilities, as described with respect to FIG. 4. The security scan may be performed using a scanning tool, such as but not limited to a TWISTLOCK® tool.

The containerization file received at step 404 (e.g., standard container images) scanned using a TWISTLOCK® tool for scanning software (NGINX® software or TOMCAT® software) and operating system (such as RED HAT® enterprise LINUX® (RHEL)) specific security policies. In the integrated business platform (such as IBP® 2.0), the container packaging device may trigger a TWISTLOCK® tool scan immediately after successful publish of image into an artifact repository manager (such as JFROG® ARTIFACTORY® environment) at step 422 via application programming interface (API) hooks. A TWISTLOCK® tool may apply broad security policies predefined by a security team that acts as quality control gates to ensure only remediated images get promoted in the artifact repository manager. Binary files baked into container layers also are analyzed by a TWISTLOCK® tool during the scanning process and finally a list of vulnerabilities and compliance issues are returned. The workflow may optionally notify the security team via a JIRA® tracking product in the event of severe vulnerabilities being detected, in which case the security team may provide input for promoting or rejecting the signed image file.

At step 416, the CPD makes a determination whether the security scan passed. If the security scan did not pass (a "no" at step 416), then the method terminates. Otherwise, (a "yes" at step 416), the method continues to step 418.

At step 418, the CPD assigns a security level to the image file. The security level may be selected from among many different predetermined security levels. In one example, the security levels are "bronze", "silver," and "gold", as described with respect to FIG. 4. The assigning of the security level may be based on a combination of the image lineage recorded at step 408, and the result of the security scan at step 414. More specifically, the computer employs a rule-based system to assign the security level. Still more specifically, the computer compares a set of pre-determined rules to information in the image lineage and the result of the security scan, as well as possibly other information such as but not limited to the type of containerization file used, the target enterprise system, etc. Based on the application of the rules, the computer determines the security level to be assigned. The image file is then signed, or labeled, with the determined security level. In this manner, the signed image file is created.

For example, the image lineage may indicate that the containerization file is well known and tested and thus reliable, but has a known vulnerability. In another example, the security scan may indicate that only one minor vulnerability exists with respect to an acceptable risk of negatively impacting the performance of an preexisting, different container already operating in the computing environment. In an embodiment, their vulnerability may not be severe enough to warrant assigning a security level less than "gold" to the image file, but when combined the security tool may predict that the image file that has been built has a risk of negatively affecting the computing environment that warrants a security level less than "gold." In other words, the combination of the image lineage and the security scan result, as opposed to either test individually, can affect which security level is assigned to the image file at step 418.

At step 420, the CPD signs the image file with the security level. Signing the security level is accomplished by storing data or metadata within the image file, wherein the data or metadata can only be modified or deleted in a preselected manner. In particular, once the image file is published, the image file cannot be changed until the image file has undergone changes based on a repeat of the method of FIG. 4. The signing may be performed using at least two different techniques, though more signing techniques are possible. For example, a GITHUB® GPG key or a DOCKER® notary could be used to sign the image file. The artifact repository can use the data or metadata that constitutes the security signature of the image file to determine how the signed image file is to be treated, how much access the signed image file has to other components of a computing environment, and the like.

At step 424, the CPD stores the signed image file as the software container. Optionally, at step 422 (as shown by the dashed box), the signed image file may be published to an artifact repository, enterprise, or other computing environment. Once published, the signed image file may be subjected to further development and testing, or may be used, as limited by the security level which is assigned to the signed image file. For example, the signed image file may be published to an artifact repository manager as a development software container when the security level is a bronze security level or a gold security level. However, the signed image file may be published to the artifact repository manager as a released software container when the security level comprises a gold security level. Optionally, the image file may be deleted from a local computer after it is published as either the development software container or the released software container.

Publication of the signed image file to the artifact repository may be periodic, such as every few weeks or automatically upon update, in order to ensure all updates are applied. Each new publication may include base operating system security updates, application stack security updates, secured configuration changes and updates, and hygiene and security enforcement.

Publication in a secure software development cycle (S-SDLC) for container images thus incorporates robust security and hygiene capabilities within the image build process as defined by security requirements. This process ensures that container images undergo layer by layer security inspection, functional validation of content and finally establishment of trust via image signing. The final standard image thus built can be reliably consumed by development teams to build additional service layers using a service specific DOCKER® file.

The one or more embodiments are accomplished using software which accomplishes, when executed, the method shown in FIG. 4. This software may be referred to as a "tool" and may be referred-to as a "container packaging device". The container packaging devices includes the required hooks for integrating with respective services, such as but not limited to: a GITHUB® service, a NOTARY® service, and a TWISTLOCK® tool. The container packaging device may be be packaged as a standalone container and may be invoked in a stage defined in the JENKINS® file of a continuous integration process. Thus, the container packaging device of the one or more embodiments provides a container management tool that provides for easier management and native integration with various platforms, such as an integrated business platform (like IBP® 2.0).

Figure 5:
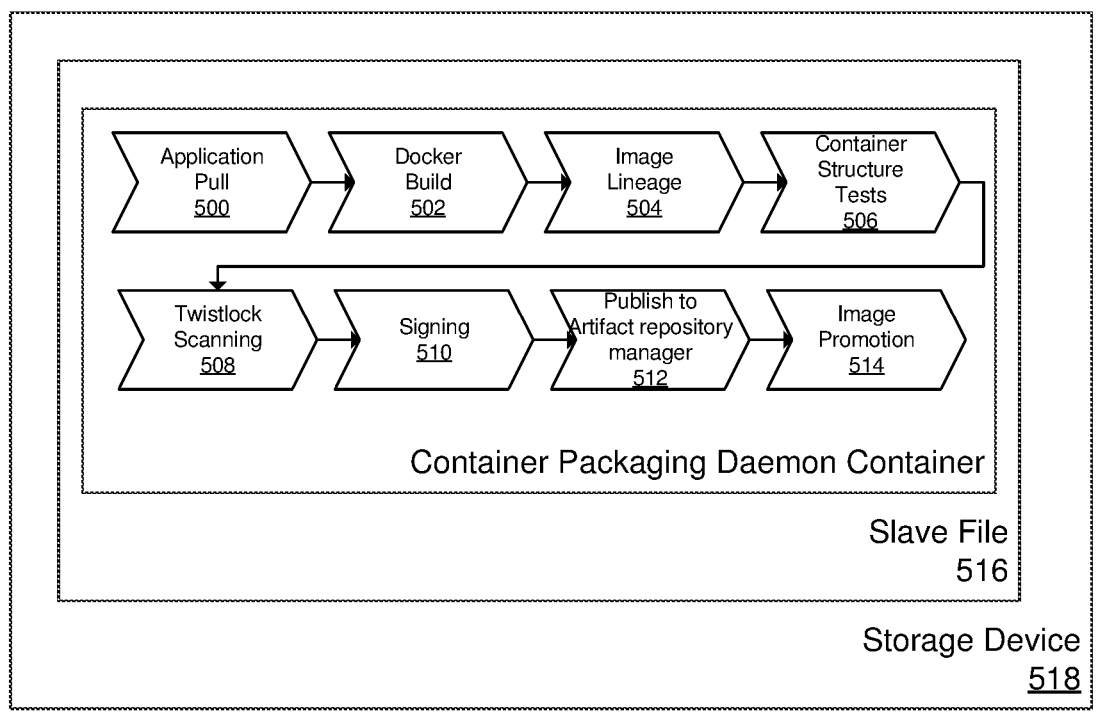
FIG. 5 and FIG. 6 depict use case examples with respect to the system diagram in FIG. 3, in accordance with one or more embodiments.
Figure 6:
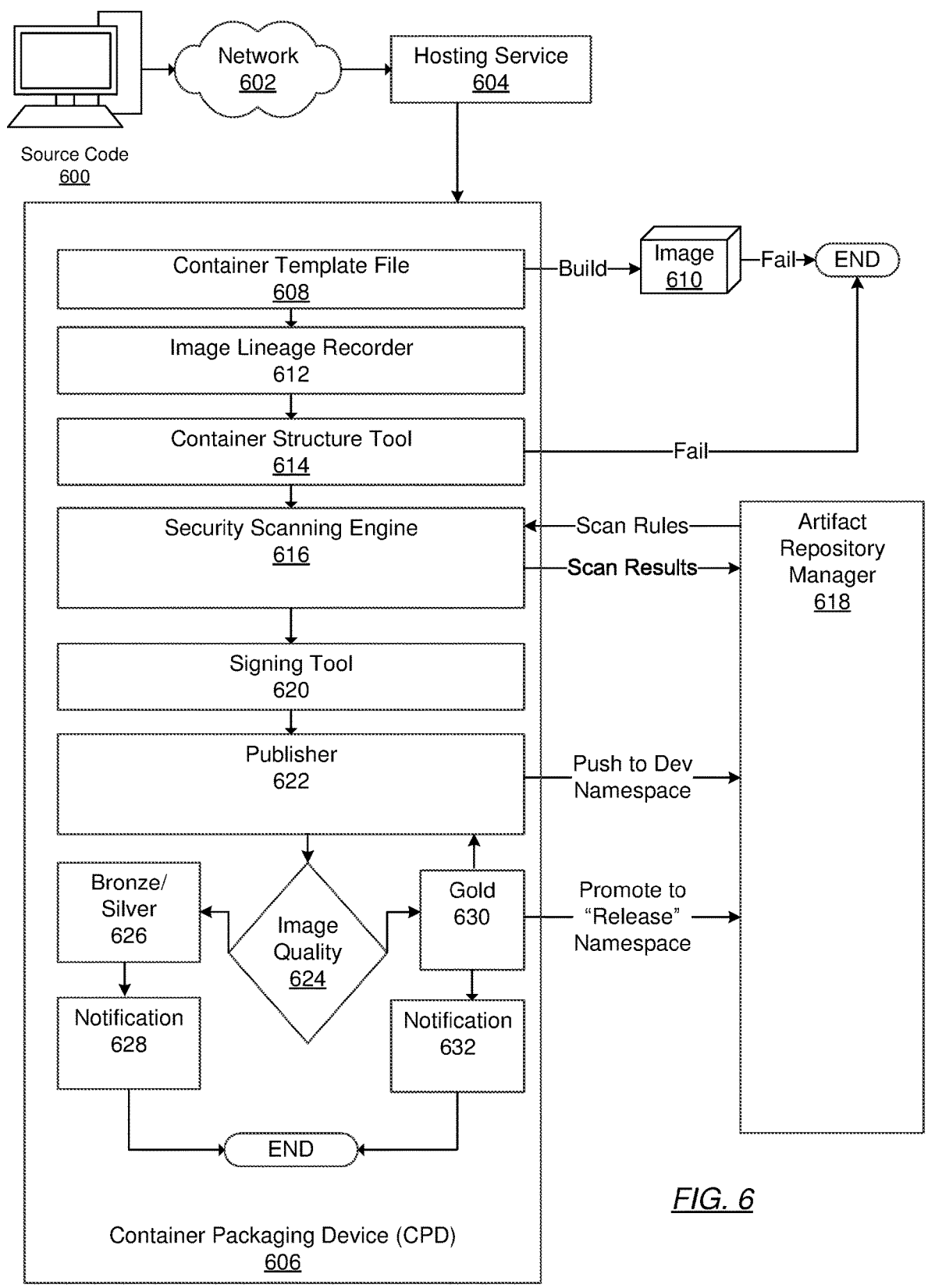
Figure 7:
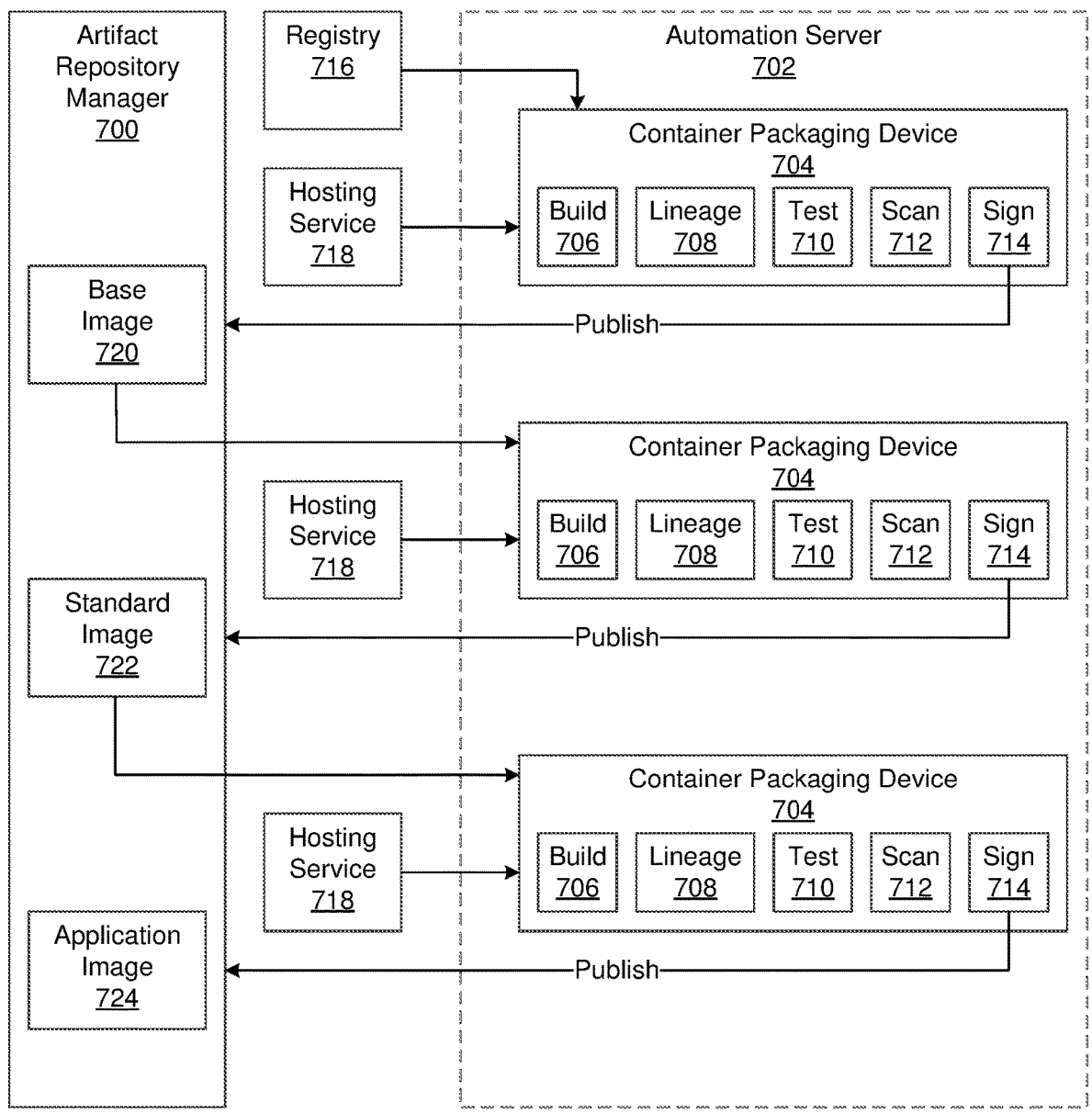
FIG. 7 depicts a use case example using multiple container packaging daemons, such as those shown in FIG. 5, in accordance with one or more embodiments.

Attention is now turned to FIG. 5, FIG. 6, and FIG. 7, which are all use-case examples of the one or more embodiments described with respect to FIG. 1 through FIG. 4. Turning first to FIG. 5, a container packaging device (CPD) workflow example is provided. In the example of FIG. 5, the CPD takes the form of a container that operates in an enterprise, and is referred to as a container packaging daemon. A daemon is a software program that executes in the background of some other process, such as an operating system. Thus, the CPD shown in the workflow of FIG. 5 automatically executes when a new container is being developed. The CPD may encompass all stages of container development, from DOCKER® file checkout to image testing, signing, scanning, publishing, and promoting in an artifact repository manager. The CPD shown in FIG. 5 is a JENKINS® plugin, which is natively supported in IBP® 2.0.

The workflow shown in FIG. 5 begins at step 500 with an application pull command. The application pull checks out the source code of the software to be containerized. In an embodiment, a GIT® pull of the latest, in-master branch in the repository specified is performed. Optionally, a different branch, tag, or commit has may be checked out. Typically, it is recommended to use the master or release branch to build images that will eventually become promoted for release as feature branch builds may not justify the overhead of signing and scanning.

Next, at step 502, a DOCKER® build is performed. This process takes a standard container, strips the standard container of any unnecessary elements, adds the source code pulled in step 500, and creates the baseline container image. All available DOCKER® file and packer files are located inside folders one level deep from a project root. DOCKER® builds are triggered in parallel depending on the number of concurrent builds set as a flag. Most project builds only have one DOCKER® file unless building sibling containers within the same repo.

Then, at step 504, an image lineage is recorded. The CPD enriches the metadata of the DOCKER® image with lineage information prior to publishing to the artifact repository manager. The history of the image is dynamically constructed at build time as an ordered list of elements, with each element corresponding to a DOCKER® file handled by CPD.

At step 506, container structure tests are performed. The test YAML file adjacent to each DOCKER® file is located and run against the container on successful DOCKER® build. The tests may be specified from among a variety of pre-built tests present in the container development computing environment.

Next, at step 508, a TWISTLOCK® environment scan is performed. The TWISTLOCK® tool applies predefined security policies that act as quality control gates to ensure only remediated images get signed as "gold" and promoted in the artifact repository manager. The CPD runs the TWISTLOCK® tool to fetch the rules package from a server and to trigger a scan of a built image. The scan results are then uploaded to the TWISTLOCK® tool as a tar.gz file. The tar.gz file is then inspected by CPD for vulnerabilities. If no severe vulnerabilities are detected, then the scan is successful. Otherwise, the process may be terminated.

At step 510, signing of the image is performed. If the security requirements are met, as defined above, CPD continues on to sign the image with a "gold" label and subsequently promote the image to the artifact repository manager for general use. If the scan detects any unacceptable vulnerabilities that are not already whitelisted in the TWISTLOCK® tool server, then the image is signed with label "silver" or "bronze" according to vulnerability severity. In this case, a JIRA® issue is created and the image will not be auto-promoted to the artifact repository manager.

At step 512, for bronze and silver images, the CPD publishes the new container to the artifact repository manager development space, such as the development space of a JFROG® ARTIFACTORY® environment repository manager. In the development space, a container can be tested or further developed, but cannot be accessed generally in the JFROG® ARTIFACTORY® environment repository manager.

In the case of a DOCKER® file, CPD fetches the repository details from a DOCKER® file YAML file. If the YAML file is not available, CPD searches for a build tag string in the DOCKER® file. The image in a local file storage may be deleted after being pushed to the JFROG® ARTIFACTORY® environment repository manager, unless specified otherwise.

At step 514, for gold images, the CPD publishes the new container to the artifact repository manager namespace, such as the name space of a JFROG® ARTIFACTORY® environment repository manager. In the name space, the container can be accessed by any other components in the computing environment. Thus, the new container may be used generally in the enterprise or other computing environment.

In an embodiment the CPD container may be represented as, or be part of, a slave file (516) held in a storage device (518). The slave may be a JENKINS® slave. The storage device may be part of IBP® 2.0. Thus, the container packaging device may be provided as both a container and also as a JENKINS® plugin, both of which are natively supported in IBP® 2.0.

Turning now to FIG. 6, another example of the operation of the container packaging device (CPD) is provided. A programmer uses a local computer to push source code (600) (i.e., the software application of interest) via a network (602) to a hosting service (604), such as a GITHUB® service. At this point, the CPD (606) begins the process of automatically containerizing the source code (600).

The CPD (606) pulls a container template file (608), such as a DOCKER® file, from a data repository and then builds an image (610). The image (610) is a container that includes the source code (600). If the image (610) fails to build for some reason, or an appropriate template file is not available, then the process fails and ends. At this point, as an alternative, a user could manually create the container file for the source code (600).

Assuming the image (610) is built from the container template file (608), then the CPD (606) uses an image lineage recorder tool (612) to record the lineage of the image. The image lineage is data and metadata which described when the image was created, which container template was used, an indication data stripped from that template, and/or other information related to how, when, and where the image (610) was created.

The CPD (606) then uses a container structure tool (614) to perform one or more container structure tests. The container structure tests are tests which verify that the image meets minimum structural requirements for operation within the destination computing environment. Thus, if the container structure tool (614) discovers a failure of the image structure, then the process terminates. The process may be attempted again for automatic image building, or may be terminated altogether in favor of manual image building.

The CPD (606) then executes a security scanning engine (616). The security scanning engine may be a container security scanning tool or service, such as a TWISTLOCK® tool. The security scanning tool or service can reside remotely on an artifact repository manager (618), such as JFROG® ARTIFACTORY® environment repository manager or other development computing environment. In this case, scan rules may be applied to the image (610) being produced by the CPD (606), and scan results may be submitted to the artifact repository manager (618) for analysis. The security scanning engine (616) may also include a machine learning decision engine, such as that described above. The machine learning decision engine uses the security scan results to determine a security level (e.g., "bronze", "silver", and "gold") to be assigned to the image (610) being built by the CPD (606).

Depending on the results of the security scanning engine (616), the CPD (606) uses a signing tool (620) to sign the image (610) with a security level. If the security level is "bronze" or "silver," then the publisher (622) pushes the image to a development (dev) namespace within the artifact repository manager (618). In the development namespace, the image (610) is permitted limited or no access to a broader computing environment or enterprise, though the image (610) may still be available for further development and testing.

At this point, the CPD takes further action depending on the image quality (624). If the image (610) has an security level (i.e., image quality) of bronze or silver (626), then a notification (628) is issued to the developer and/or to the artifact repository manager (618) that the image (610) has been pushed to the development namespace of the artifact repository manager (618). The notification may be a slack notification. The operation of the container packaging device (606) may terminate thereafter, though optionally a local version of the image (610) may be deleted after publication to the artifact repository manager (618).

On the other hand, if the image (610) has a security level (i.e., image quality) of gold (630), then the publisher (622) may promote the image (610) to a release namespace in the artifact repository manager (618). In the release namespace, the image (610) is permitted general access to the broader computing environment or enterprise. In effect, when published to the release namespace, the image (610) becomes part of the target computing environment or enterprise, though remains subject to further updates and changes. A notification (632) is issued to the developer and/or to the artifact repository manager (618) that the image (610) has been pushed to the release namespace of the artifact repository manager (618). The notification may be a slack notification, a notification via email, or some other notification method. The operation of the container packaging device (606) may terminate thereafter, though optionally a local version of the image (610) may be deleted after publication to the artifact repository manager (618).

FIG. 7 is a schematic diagram illustrating a use case in which lifecycle management for container development is described. In the example shown in FIG. 7, the artifact repository manager (700) may be a JFROG® ARTIFACTORY® environment repository manager, which is in this example is used to manage software used in an enterprise or other computing environment. The automation server (702) is the local computer used to execute the container packaging device (704). The container packaging device (704) may be, itself, embodied as a container and thus be executable on multiple computing environments. Each time the container packaging device (704) is called, the container packaging device (704) will execute the steps of build (706) the image, record the image lineage (708), test the image (710), scan (712) the image to determine a security level and then sign (714) the image with the determined security level. This process is described in detail with respect to FIG. 2 through FIG. 6.

Initially, the container packaging device (704) receives a template container from a registry (716) as a result of a command received from a hosting service (718). The container packaging device (704) builds, scans, signs, and publishes a signed image, initially a bronze image, called a base image (720) in this example. The base image is published in a development space of the artifact repository manager (700).

After further development, as a result of a command from the hosting service (718), the container packaging device (704) updates the base image (720) and builds a new image. The new image is scanned, signed, and published as a silver image, called a standard image (722) in this example. The standard image (722) is also published in a development space of the artifact repository manager (700). Thus, the quality of the image has improved, but is not yet ready for general publication.

After further development, as a result of a command from the hosting service (718), the container packaging device (704) updates the standard image (722) and builds yet another new image. This revised image is scanned, signed, and published as a gold image, called an application image (724) in this example. The application image is published to a namespace of the artifact repository manager (700), indicating that the application image is ready for operational use in the target enterprise or computing environment.

Thus, the images to be signed and labeled fall under two lifecycle phases, "build time images" (base image (720) and standard image (722)) and "run time images" (application image (724)). Build time denotes the status of the base image at build and run time describing the status of the image during execution. Using current guiding principles and standards, images in both areas will then be signed by container packaging device (704) as Gold, Silver, or Bronze based on the level of criteria that it has met. Build time images may be used as base images for building other images. Run time images are those that will be used in deployment.

The container packaging device (704) may take inputs from dockerfile.yml to determine the type of image being built, build time or run time, and apply the labeling heuristics appropriately. Signing levels for derived images are to a greater extent influenced by their parent image levels. This fact means that an image (either build time or run time) derived from a "silver" level parent image will most likely not be promoted to "gold", but can potentially be downgraded to "bronze" based on scan findings.

Statically building images using a DOCKER® SCRATCH® service, an explicitly empty image, can achieve Gold Level Qualification on successful TWISTLOCK® tool scan. The container packaging device (704) may add {"tier": "silver", "tiertype": "runtime"} to the lineage label to track container promotion and build history.

In an embodiment, standard images may adhere to semantic versioning standards known in the art. In an embodiment, old or deprecated images, such as for example greater than 60 days old, may be marked for sunset and stripped of tags. Such old or deprecated images may be moved automatically to an archive in the artifact repository manager (700) for later cleanup.

Thus, in summary, the container packaging device (704) is a custom tool written in Golang that is built to be self-driven, encompassing the stages of containerization from DOCKER® file checkout to image testing, signing, scanning, publishing, and promotion in an artifact repository manager (700), such as JFROG® ARTIFACTORY® environment repository manager. The container packaging device (704) is provided as a container and also as a JENKINS® plugin for additional flexibility. The latest container image may be published to the artifact repository manager (700) get picked up in IBP automatically for subsequent builds. Accordingly, the container packaging device (704) is used to build standard container images that are put through the whole cycle of testing, signing, scanning and eventual promotion as golden images into a release namespace of the artifact repository manager (700).

Thus, the container packaging device (704) provides for a secure software development cycle (S-SDLC) for container images that specifically incorporates robust security and hygiene capabilities within the image build process. The container packaging device (704) ensures that container images undergo layer by layer security inspection, functional validation of content, and finally establishment of trust via image signing. The final standard image thus built can be reliably consumed in an enterprise or other computing to build additional service layers using their service specific DOCKER® files.

Figure 8A:
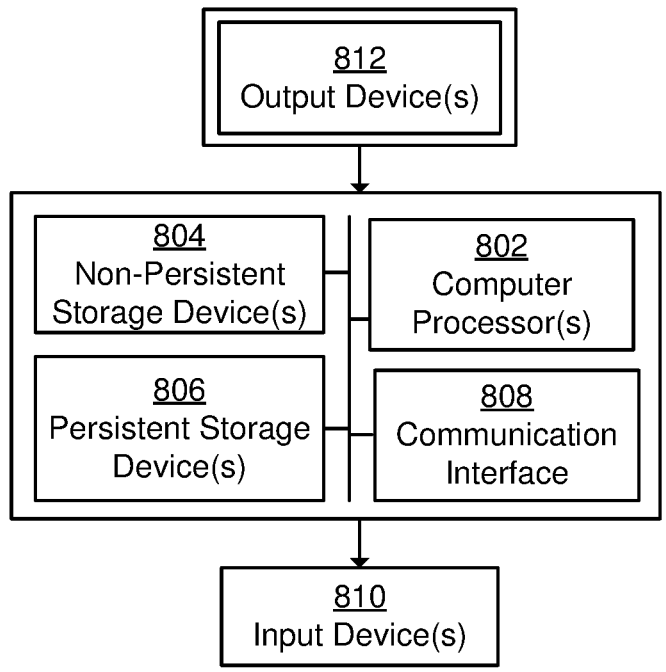
FIGS. 8A and 8B depicts a computer system and network in accordance with one or more embodiments

Embodiments of the invention may be implemented on a computing system. Any combination of mobile, desktop, server, router, switch, embedded device, or other types of hardware may be used. For example, as shown in FIG. 8A, the computing system shown may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (808) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system may include one or more output devices (812), such as a screen (e.g., a liquid crystal display (LCD), a plasma display, touchscreen, cathode ray tube (CRT) monitor, projector, or other display device), a printer, external storage, or any other output device. One or more of the output device(s) (812) may be the same or different from the input device(s) (810). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
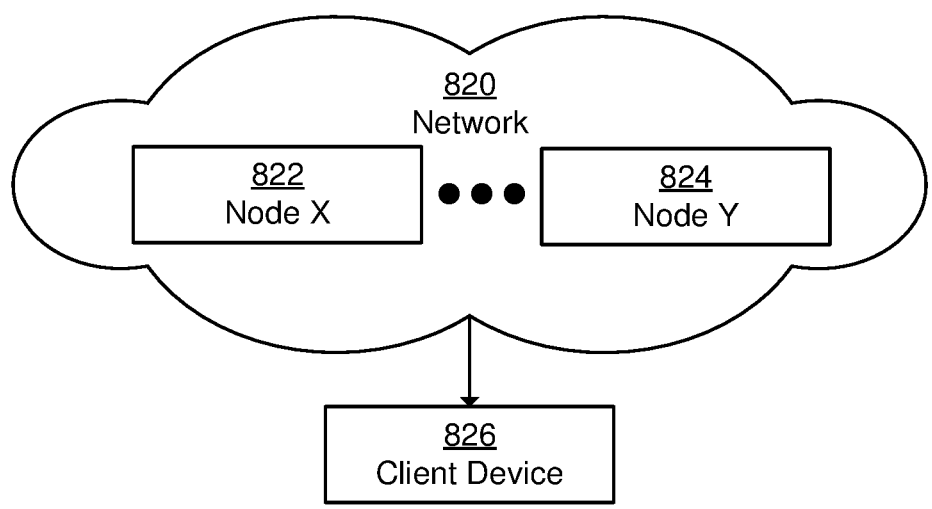

The computing system in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a software container, the method comprising:
   receiving a software application and a containerization file;
   building an image file using the containerization file, the image file containing the software application;
   recording, in the image file, an image lineage;
   performing a security scan of the image file to obtain a result, the security scan comprising checking the image file for inadequacies;
   assigning, to the image file, a security level selected from among a plurality of different predetermined security levels,
      wherein assigning is based on a combination of the image lineage and the result of the security scan;
   signing the image file with the security level to create a signed image file; and
   storing the signed image file as the software container.

2. The method of claim 1, further comprising:
   testing the image file prior to recording the image lineage.

3. The method of claim 1, further comprising:
   performing a container structure test on the image file after recording the image lineage and prior to performing the security scan of the image file, and
   wherein assigning is further based on a container structure test result.

4. The method of claim 1, wherein the security scan is performed by a remote security scanning tool.

5. The method of claim 4, further comprising:
   publishing the signed image file to an artifact repository manager.

6. The method of claim 5, wherein the plurality of different predetermined security levels comprises a first security level, a second security level, and a third security level, wherein the first security level comprises a highest security level, the second security level comprises a middle security level less secure than the first security level, and the third security level comprises a lowest security level less than the second security level.

7. The method of claim 6 further comprising:
   publishing the signed image file to the artifact repository manager as a development software container when the security level comprises the second security level or the third security level; and
   publishing the signed image file to the artifact repository manager as a released software container when the security level comprises the first security level.

8. The method of claim 7 further comprising:
   deleting the image file after publishing the software container as either the development software container or the released software container.

9. A system comprising:
   a data repository storing a software application and a containerization file;
   an image file builder configured to:
      build, using the containerization file, an image file containing the software application,
      record an image lineage for the image file, and
      add the image lineage to the image file;
   a decision engine configured to:
      receive a security scan result produced as a result of performing a security scan on the image file with the image lineage,
      determine a security level of the image file based on a combination of the image lineage and the security scan result, the security level selected from a plurality of pre-determined security levels, and
      sign the image file with the security level to form a signed image file; and
   a publisher configured to publish the signed image file to an artifact repository manager based on the security level identified in the signed image file.

10. The system of claim 9, wherein the publisher is further configured to publish the signed image file to the artifact repository manager as one of a development software container available only for software development or a released software container available for execution, and wherein the publisher is configured to publish the signed image file as the development software container or the released software container.

11. The system of claim 9, further comprising:
   a security engine configured to send the image file to a remote security scanning tool prior to the decision engine receiving the security scan result, wherein the remote security scanning tool is configured to perform the security scan.

12. The system of claim 9, further comprising:
a security engine configured to perform the security scan with a scanning tool.

13. The system of claim 12, further comprising:
a test integrator configured to:
  perform structural tests on the image file prior to application of the security engine; and
  send the image file, responsive to the structural tests passing, to the security engine.

14. The system of claim 9, wherein the publisher is further configured to delete the signed image file from a local computer after publishing the signed image file to the artifact repository manager.

15. A non-transitory computer readable medium comprising computer readable program code, the computer readable program code for causing a computer system to:
  receive a software application and a containerization file;
  build an image file using the containerization file, the image file containing the software application;
  record, in the image file, an image lineage;
  perform a security scan of the image file to obtain a result, the security scan comprising checking the image file for inadequacies;
  assign, to the image file, a security level selected from among a plurality of different predetermined security levels,
    wherein assigning is based on a combination of the image lineage and the result of the security scan;
  sign the image file with the security level to create a signed image file; and
  store the signed image file as a software container.

16. The non-transitory computer readable storage medium of claim 15, the computer readable program code for further causing the computer system to:
  perform a container structure test on the image file after recording the image lineage and prior to performing the security scan of the image file, and
  wherein the computer readable program code for causing the computer system to assign is further based on a container structure test result.

17. The non-transitory computer readable storage medium of claim 16, the computer readable program code for further causing the computer system to:
  publish the signed image file to an artifact repository manager.

18. The non-transitory computer readable storage medium of claim 17, wherein the plurality of different predetermined security levels comprises a first security level, a second security level, and a third security level, wherein the first security level comprises a highest security level, the second security level comprises a middle security level less secure than the first security level, and the third security level comprises a lowest security level less than the second security level.

19. The non-transitory computer readable storage medium of claim 18, the computer readable program code for further causing the computer system to:
  publish the signed image file to the artifact repository manager as a development software container when the security level comprises the second security level or the third security level; and
  publish the signed image file to the artifact repository manager as a released software container when the security level comprises the first security level.

* * * * *